United States Patent
Omura et al.

(10) Patent No.: US 8,035,262 B2
(45) Date of Patent: Oct. 11, 2011

(54) DRIVE UNIT AND IMAGE FORMING APPARATUS EQUIPPED WITH THE SAME

(75) Inventors: Hiroyoshi Omura, Osaka (JP); Yuuya Shimohara, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 340 days.

(21) Appl. No.: 12/212,826

(22) Filed: Sep. 18, 2008

(65) Prior Publication Data

US 2009/0179528 A1    Jul. 16, 2009

(30) Foreign Application Priority Data

Jan. 16, 2008 (JP) .................................. 2008-006394

(51) Int. Cl.
*H02K 11/00* (2006.01)
*H02K 23/66* (2006.01)

(52) U.S. Cl. ......... 310/68 B; 310/67 R; 310/89; 310/91; 310/99; 324/200; 324/207

(58) Field of Classification Search ................ 310/67 R, 310/68 B, 89, 91, 99; 324/200, 207; *H02K 11/00, H02K 23/66*
See application file for complete search history.

(56) References Cited

U.S. PATENT DOCUMENTS

| | | | |
|---|---|---|---|
| 5,701,549 A * | 12/1997 | Portig et al. ..................... 399/36 |
| 5,708,933 A * | 1/1998 | Nogami et al. ............... 399/167 |
| 5,761,580 A * | 6/1998 | Harada et al. ................. 399/167 |
| 5,905,927 A * | 5/1999 | Inoue et al. .................... 399/167 |
| 6,608,483 B1 * | 8/2003 | Hill ............................... 324/458 |
| 7,728,582 B2 * | 6/2010 | Kobayashi ..................... 324/174 |
| 2002/0163266 A1 * | 11/2002 | Tsujimoto et al. ............... 310/83 |
| 2003/0038550 A1 * | 2/2003 | Pan et al. ..................... 310/68 B |
| 2009/0179528 A1 * | 7/2009 | Omura et al. ............... 310/68 B |

FOREIGN PATENT DOCUMENTS

| | | |
|---|---|---|
| JP | H06-327278 A | 11/1994 |
| JP | 2003-023755 A | 1/2003 |
| JP | 2003023755 A * | 1/2003 |
| WO | WO 2006106797 A1 * | 10/2006 |

OTHER PUBLICATIONS

Machine Translation of Imamura et al, JP 2003-023755, Jan. 2003.*
Imamura et al, JP 2003/23755, English translation, 2003.*

* cited by examiner

*Primary Examiner* — Quyen Leung
*Assistant Examiner* — John K Kim
(74) *Attorney, Agent, or Firm* — Fitch, Even, Tabin & Flannery

(57) ABSTRACT

A drive unit includes a motor being a drive source, a velocity reduction gear for reducing the revolution of the motor, an output shaft for connecting the velocity reduction gear to the rotation shaft of a photosensitive drum, and a velocity detection mechanism including an encoder and sensor members and detecting the revolution of the output shaft. The velocity reduction gear and the velocity detection mechanism are placed in a unit housing including a housing body made of a resin with one end opened and a support plate made of metal closing the opening of the housing body, and the output shaft is rotatably supported by the housing body and the support plate.

7 Claims, 7 Drawing Sheets

DRIVE UNIT AND IMAGE FORMING APPARATUS EQUIPPED WITH THE SAME

INCORPORATION BY REFERENCE

This application is based upon and claims the benefit of priority from the corresponding Japanese Patent Application No. 2008-006394, filed Jan. 16, 2008, the entire contents of which is incorporated herein by reference.

FIELD OF THE INVENTION

The present invention pertains to a drive unit capable of driving a rotation member and detecting and controlling the rotations thereof.

BACKGROUND OF THE INVENTION

In image forming apparatuses such as a copying machine, a printer, a facsimile, and the like, various members to be rotated are used for image forming processing. For example, in an image forming portion of an electrophotographic system, a photosensitive drum is placed, and rotation members such as a transfer roller and a cleaning roller are provided in contact with the surface of the photosensitive drum. The photosensitive drum and the members to be rotated are rotatably driven at a predetermined velocity (rpm), and an image is formed through processes such as charging, exposure, toner image formation on the drum surface, transfer of a toner image onto paper, and cleaning of a drum surface.

In order to rotate the above-mentioned members to be rotated at low velocity with a high precision, a rotation drive apparatus having a motor, and a velocity reduction gear for reducing the revolution of the motor, and a velocity detection mechanism for detecting the revolution of the motor is required. As the velocity detection mechanism, a configuration using an encoder and an optical sensor as described in JP 06-327278 A is generally used.

Conventionally, the velocity detection mechanism is attached directly to a drive output shaft and a drive roller outside of a unit without being protected with a housing or the like. Therefore, there is a fear in that foreign matters such as lubricating oil and abrasion powder may adhere to an encoder and a sensor to cause a reading defect of the sensor. Further, the setting space in a direction of the rotation shaft is also required, and hence assembly operability is poor. Further, because the encoder and the sensor are fixed, it is difficult to adjust the gap between the encoder and the sensor. For example, in the case where the members to be rotated are rotated while the encoder and the sensor are in contact with each other, there is a problem in that abrasion of the encoder may occur.

Then, a method of reducing the contamination of the encoder and the sensor, reducing space requirements, and enhancing assembly operability has been proposed, and JP 2003-23755 A discloses a rotation drive apparatus in which a velocity detection mechanism is accommodated in a housing together with a velocity reduction apparatus, and a window portion for adjustment for adjusting the attachment position of a detection unit to the housing is provided.

However, according to the method of JP 2003-23755 A, a housing structure in which a velocity-reducing mechanism is separated from a velocity detection mechanism is used, and support bearings of an output shaft are set on a partition wall surface that separates an outer wall surface of the housing from the inside of the housing. Therefore, the intervals between the support bearings are short, and the tilt of the output shaft may be increased depending on the size error of the support positions of the bearings. Further, the housing is separated into a first member and a second member, and hence it is necessary to enhance a molding precision of the housing as well as an alignment precision, which is inconvenient in terms of production and cost.

Further, in order to prevent contact between the encoder and the sensor, it is necessary to adjust the position of the sensor in the shaft direction. However, the adjustment of the attachment position of the detection unit described in JP 2003-23755 A relates to a position adjustment in the radial direction of the encoder, while a position adjustment in the shaft direction is not described.

SUMMARY OF THE INVENTION

In view of the above problems, it is an object of the present invention to provide a drive unit which is capable of preventing the adhesion of foreign matters to an encoder and a sensor, is also effective for the tilt of an output shaft, and can be produced easily at low cost, and an image forming apparatus using the drive unit.

In order to achieve the above-mentioned object, one aspect of the present invention is to provide a drive unit including:

a motor being a drive source for rotating a member to be rotated;

a velocity reduction gear for reducing a revolution of the motor;

an output shaft for connecting the velocity reduction gear to the member to be rotated; and a velocity detection mechanism including an encoder and a sensor member for detecting a revolution of the output shaft, in which the velocity reduction gear and the velocity detection mechanism are placed in a unit housing including a housing body with an opening formed at one end and a support plate closing the opening; and the output shaft is rotatably supported by the housing body and the support plate.

As mentioned above, the velocity reduction gear and the velocity detection mechanism are both accommodated in the unit housing, and can be incorporated in a body of an image forming apparatus as a drive unit. Therefore, the adhesion of foreign matters such as dust to an encoder and a sensor member can be prevented, and the image forming apparatus can be miniaturized and the space thereof can be reduced, which enhances the assembly operability of the drive unit and the attachability/detachability to and from the body of the apparatus. Further, since the output shaft is supported by the housing body and the support plate, the support interval of the output shaft can be enlarged. Thus, the tilt of the output shaft caused by the precision of the support position can be decreased.

According to another aspect of the present invention, in the drive unit with above-mentioned configuration, the encoder is attached to a side of an encoder attachment bracket fixed to the output shaft opposite to the velocity reduction gear, and an outer diameter of the encoder attachment bracket is set to be larger than an outer diameter of the encoder.

By one approach, the encoder is attached to the side of the encoder attachment bracket that is fixed to the output shaft opposite to the velocity reduction gear, and the outer diameter of the encoder attachment bracket is set to be larger than that of the encoder. Thus, the encoder attachment bracket functions as a partition wall that partitions the velocity reduction gear from the encoder and a sensor member, and hence lubricating oil and abrasion powder scattered from the velocity reduction gear can be prevented from adhering to the encoder and the sensor member.

According to another further aspect of the present invention, in the drive unit with above-mentioned configuration, a plurality of the sensor members are placed at positions for equally dividing an outer periphery of the encoder such that a velocity fluctuation component caused by the eccentricity of the encoder can be detected. Thus, an angular velocity fluctuation component of an output shaft obtained by subtracting the fluctuation component caused by the eccentricity of the encoder from the detected velocity fluctuation is targeted for feedback control, whereby the rotation nonuniformity of the output shaft can be corrected with a high precision.

According to another further aspect of the present invention, in the drive unit with above-mentioned configuration, the sensor member is set to be attachable to and detachable from outside of the housing body.

By one approach, the sensor member is set to be attachable to and detachable from the outside of the housing body, whereby the operability during attachment and replacement of the sensor member is enhanced.

According to another further aspect of the present invention, in the drive unit with above-mentioned configuration, a position in a shaft direction of the sensor member is set to be adjustable from outside of the drive unit.

By one approach, the position in the shaft direction of the sensor member is set to be adjustable from outside of the drive unit, whereby the clearance between the encoder and the sensor member can be adjusted easily.

According to another further aspect of the present invention, in the drive unit with the above-mentioned configuration, the sensor member is set to be covered with a cover member that can be opened and closed such that the sensor member can be sealed in the unit housing, and the occurrence of a reading defect caused by the adhesion of dust and foreign matters can be prevented.

Another further aspect of the present invention is to provide an image forming apparatus including the drive unit.

So configured, the image forming apparatus can control the revolution of the members to be rotated with high precision, and thus, can effectively suppress the degradation in image quality involved in the rotation nonuniformity of the members to be rotated.

In this text, the terms "comprising", "comprise", "comprises", and other forms of "comprise" can have the meaning ascribed to these terms in U.S. Patent Law and therefore can mean "including","include","includes" and other forms of "include". These words are therefore generally understood to refer to a non-exclusive listing that will accommodate other components, elements, or steps that are not specifically set forth.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which.

DETAILED DESCRIPTION OF THE PREFFERRED EMBODIMENTS

Reference will now be made in detail to various embodiments of the invention, one or more examples of which are illustrated in the accompanying drawings. Each example is provided by way of explanation of the invention, and by no way limiting the present invention. In fact, it will be apparent to those skilled in the art that various modifications, combinations, additions, deletions and variations can be made with respect to these described embodiments without departing from the scope or spirit of the present invention. For instance, features illustrated or describe as part of one embodiment can be used in another embodiment to yield a still further embodiment. It is intended that the present invention encompass such modifications, combinations, additions, deletions, applications and variations that come with in the scope of the appended claims.

Figure 1:
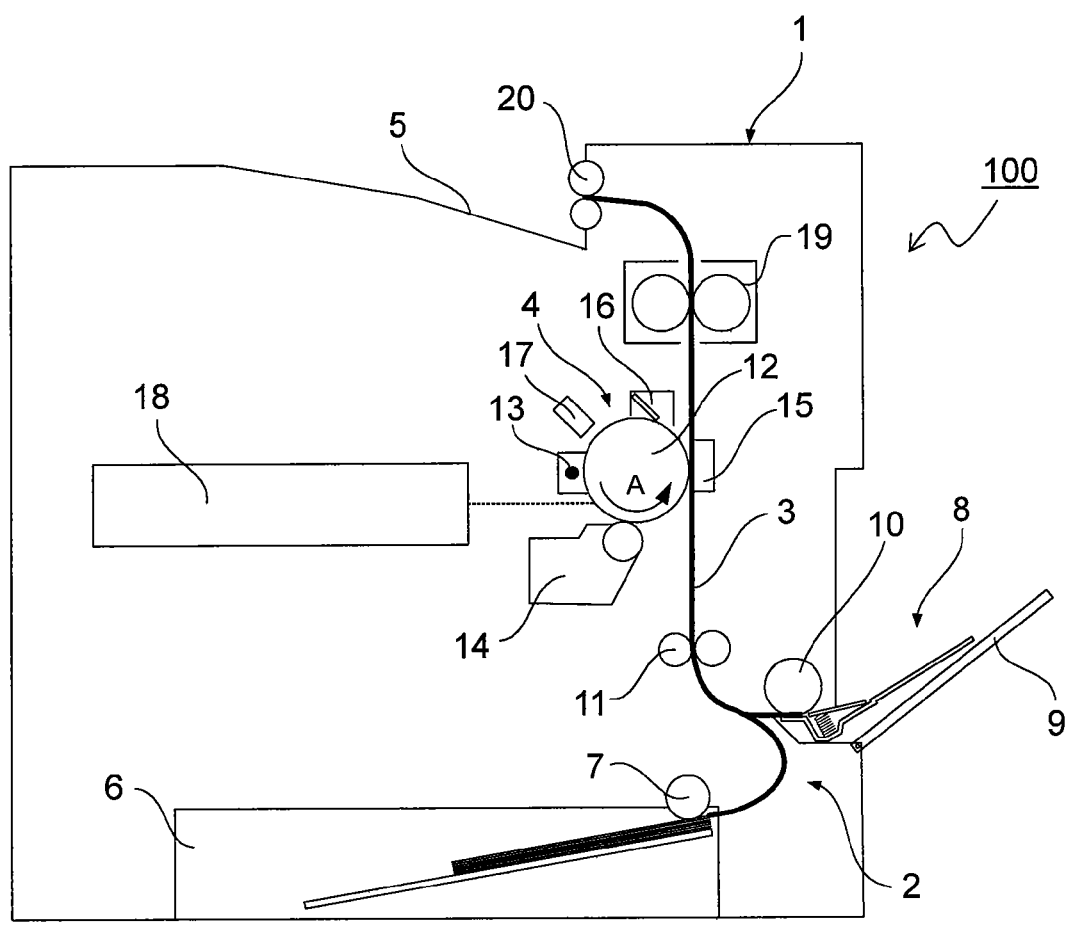
FIG. 1 is a schematic cross-sectional view of an image forming apparatus with a drive unit of the present invention mounted thereon.

FIG. 1 is a schematic view illustrating an entire configuration of an image forming apparatus with a drive unit of the present invention mounted thereon. As illustrated in FIG. 1, an image forming apparatus 100 includes a paper feed portion 2 provided in a lower portion of an apparatus body 1, a paper transport path 3 provided on the side of and above the paper feed portion 2, an image forming portion 4 provided on the left side of the paper transport path 3, and a discharge portion 5 provided in an upper portion of the apparatus body 1.

The paper feed portion 2 includes a paper feed cassette 6 storing sheets of paper, and a manual paper feed apparatus 8 that can be opened/closed, provided on a side surface of the apparatus body 1. In the paper feed cassette 6, sheets of paper are sent out from the paper feed cassette 6 to the paper transport path 3 side by the rotation of a pickup roller 7, and the sheets of paper are fed to the paper transport path 3 exactly one by one. The paper feed cassette 6 is configured so as to be attachable/detachable with respect to the apparatus body 1.

Further, the manual paper feed apparatus 8 includes a paper loading tray 9 and a paper feed roller 10. The paper loaded on the paper loading tray 9 is fed from the paper loading tray 9 to the apparatus body 1 by the rotation of the paper feed roller 10, and fed to the paper transport path 3 one by one.

The paper fed to the paper transport path 3 is transported to the image forming portion 4 at a predetermined timing by a pair of resistration rollers 11. The image forming portion 4 forms a predetermined toner image on paper by an electrophotographic process, and includes a photosensitive drum 12 being an image carrying body axially supported rotatably in a predetermined direction (direction indicated by arrow A of FIG. 1), and a charging unit 13, a developing unit 14, a transfer unit 15, a cleaning unit 16, and a diselectrifying unit 17 on the periphery of the photosensitive drum 12 in a rotation direction thereof.

The charging unit 13 includes a charging wire to which a high voltage is applied, and a predetermined electric potential is applied to the surface of the photosensitive drum 12 by corona discharge from the charging wire, whereby the surface of the photosensitive drum 12 is charged uniformly. Then, an electrostatic latent image is formed on the photosensitive drum 12 by a laser beam from a laser scanning unit (LSU) 18 based on the input image data. Then, toner adheres to the electrostatic latent image by the developing unit 14, whereby a toner image is formed on the surface of the photosensitive drum 12. The toner image on the surface of the photosensitive drum 12 is transferred to paper supplied between the photosensitive drum 12 and the transfer unit 15 by the transfer unit 15.

The paper with the toner image transferred thereto is transported from the image forming portion 4 to a fixing apparatus 19. The fixing apparatus 19 is placed on a downstream side in the paper transport direction of the image forming portion 4, and the paper with the toner image transferred thereto in the image forming portion 4 is heated and pressed by a heating roller and pressing roller pressed against the heating roller, constituting the fixing apparatus 19, whereby the toner image is fixed to the paper.

Then, the paper with the toner image fixed thereto in the fixing apparatus 19 is discharged to the discharge portion 5 by a pair of discharge rollers 20. On the other hand, the toner remaining on the surface of the photosensitive drum 12 after the above transfer is removed by the cleaning unit 16, and the charge remaining on the surface of the photosensitive drum 12 is removed by the diselectrifying unit 17. Then, the photosensitive drum 12 is charged again by the charging unit 13, and thereafter, image formation is performed in the same way.

Figure 2:
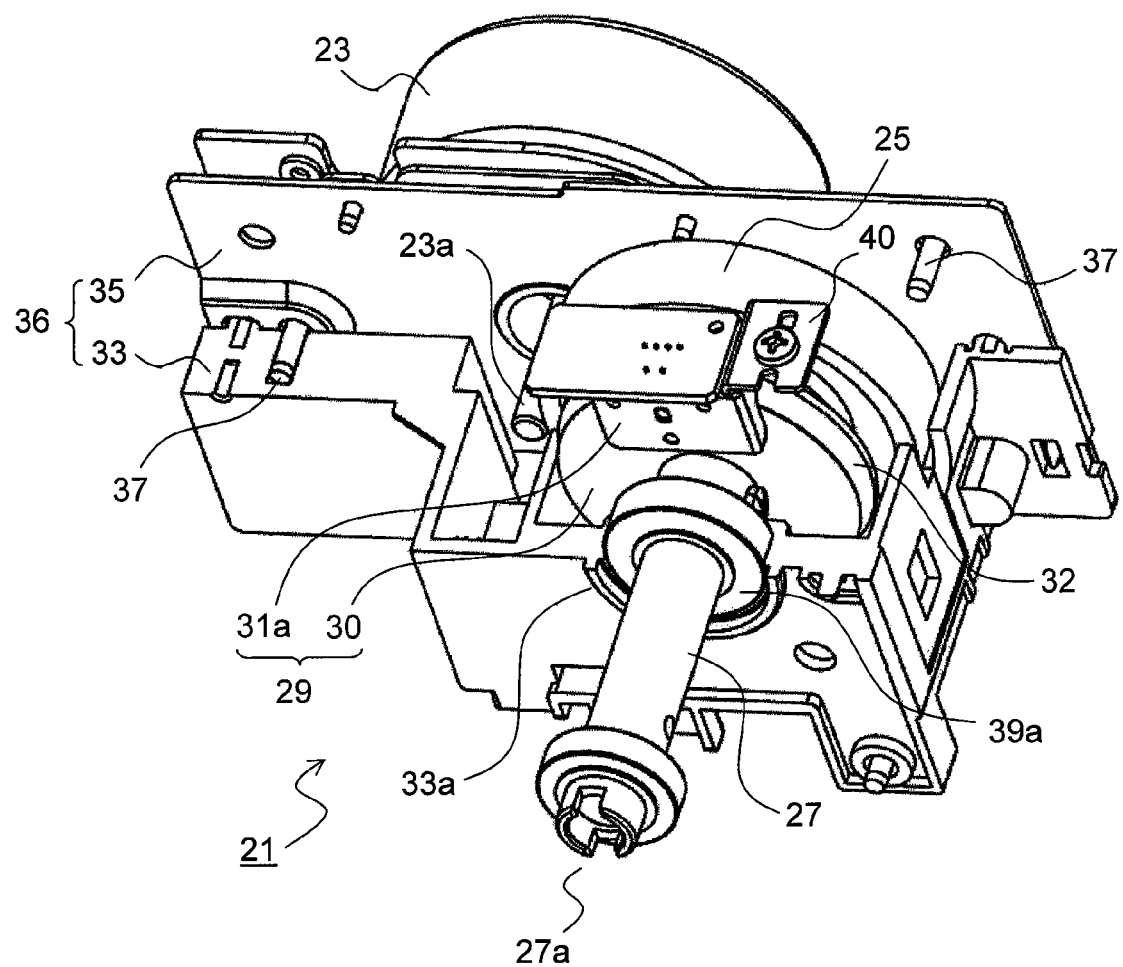
FIG. 2 is a perspective view of the drive unit for driving a photosensitive drum of the image forming apparatus illustrated in FIG. 1.
Figure 3:
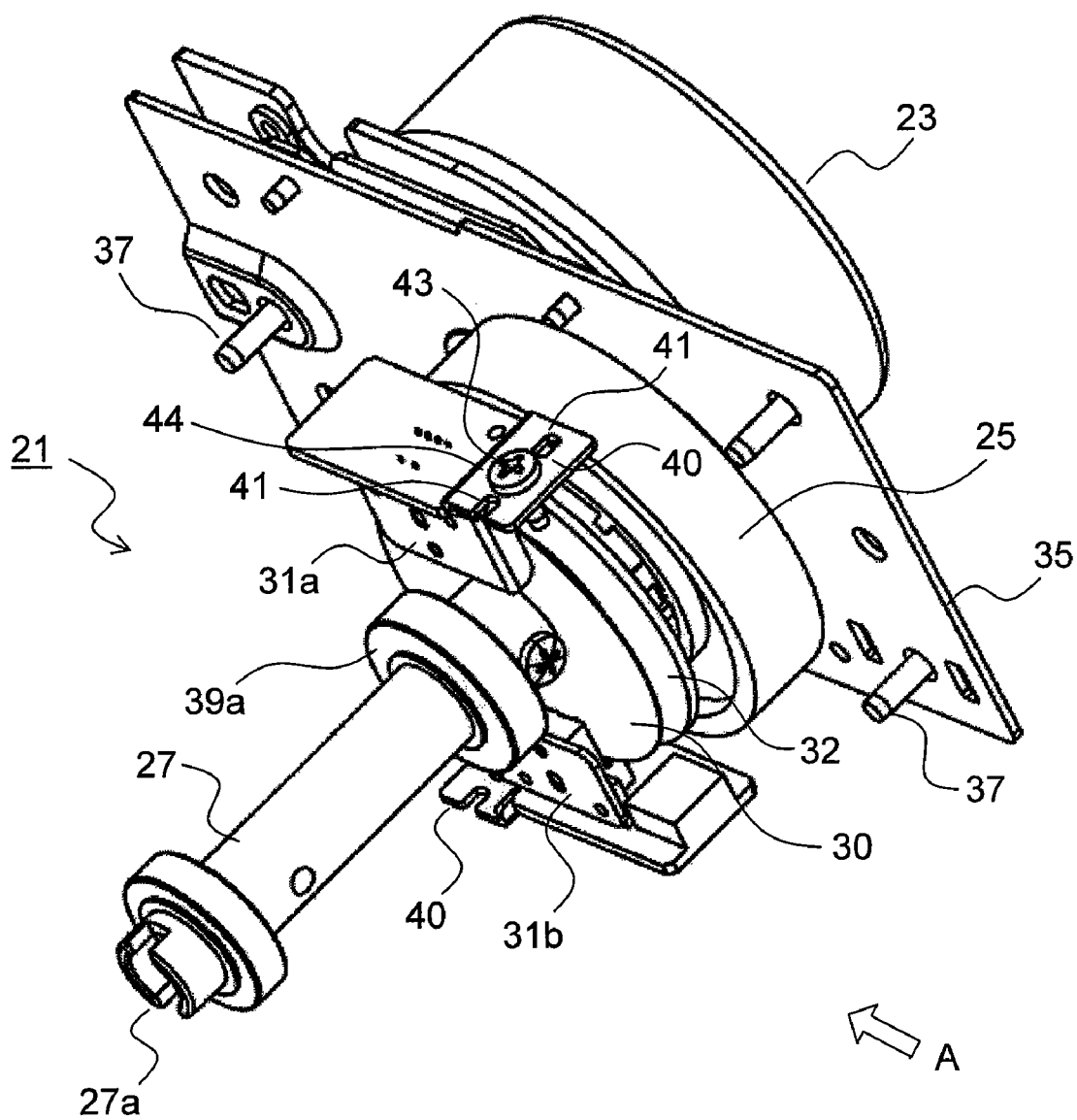
FIG. 3 is a perspective view illustrating a state in which a housing body is removed from the drive unit.
Figure 4:
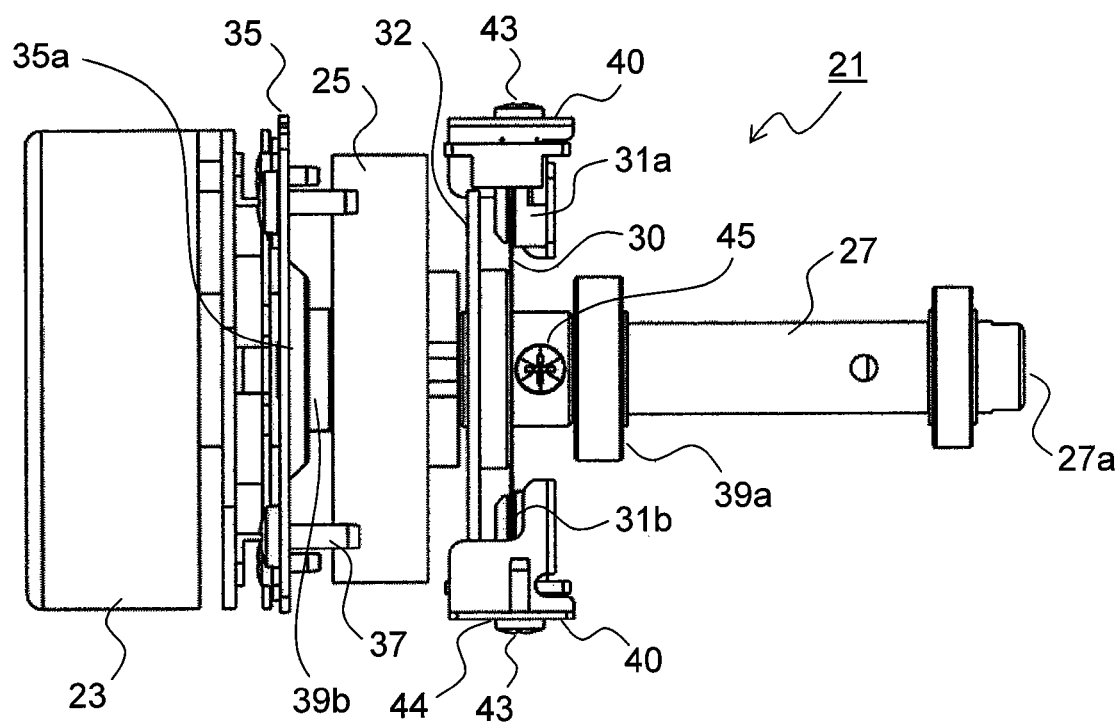
FIG. 4 is a side view illustrating a state in which the housing body is removed from the drive unit.

FIG. 2 is a perspective view of a drive unit for driving the photosensitive drum of the image forming apparatus illustrated in FIG. 1. (Note that FIG. 2 illustrates a state in which a part (the upper half of FIG. 2) of the housing is cut away so as to illustrate an internal structure of the drive unit.) FIG. 3 is a perspective view illustrating a state in which a housing body is removed from the drive unit. FIG. 4 is a side view seen from the direction indicated by arrow A. The following description is provided with reference to FIGS. 2 to 4.

The drive unit 21 includes a motor 23 being a drive source for rotating the photosensitive drum 12 (see FIG. 1), a velocity reduction gear 25 being connected to a drive output gear 23a of the motor 23 and reduces the revolution of the motor 23, an output shaft 27 that connects the velocity reduction gear 25 to the rotation shaft of the photosensitive drum 12, and a velocity detection mechanism 29 that detects the revolution of the output shaft 27. The velocity reduction gear 25 and the velocity detection mechanism 29 are placed in a unit housing 36 including a housing body 33 made of a resin with one end (the back side of the paper of FIG. 2) opened and a support plate 35 made of metal that closes the opening of the housing body 33, and the motor 23 is fixed on a side of the support plate 35 opposite to the housing body 33. The housing body 33 and the support plate 35 are fixed to each other with a plurality of screws 37. A through hole 33a through which one end of the output shaft 27 protrudes is formed in the housing body 33, and a coupling 27a for connection to the rotation shaft of the photosensitive drum 12 is provided at the tip end of the output shaft 27.

As illustrated in FIG. 4, drawing (spinning) is provided at substantially center portion of the support plate 35 and a through-hole 35a that supports the other end of the output shaft 27 is formed. Bearings 39a, 39b are inserted over the output shaft 27, and the bearings 39a, 39b are fixed to the through-holes 33a, 35a, respectively. Thus, the output shaft 27 is rotatably supported by the housing body 33 and the support plate 35 via the bearings 39a, 39b. that rotates together with the output shaft 27 and sensor members 31a, 31b placed in an outer peripheral portion of the encoder 30. The encoder 30 is fixed to the output shaft 27 via an encoder attachment bracket 32, and the sensor members 31a, 31b are fixed to the housing body 33 via sensor attachment plates 40. As illustrated in FIG. 3, the sensor attachment plates 40 are provided with two long holes 41 with which support bosses 50 (see FIG. 6) on the housing body 33 side are engaged, and a guide hole 44 in which an adjustment screw 43 is freely fitted.

Figure 5:
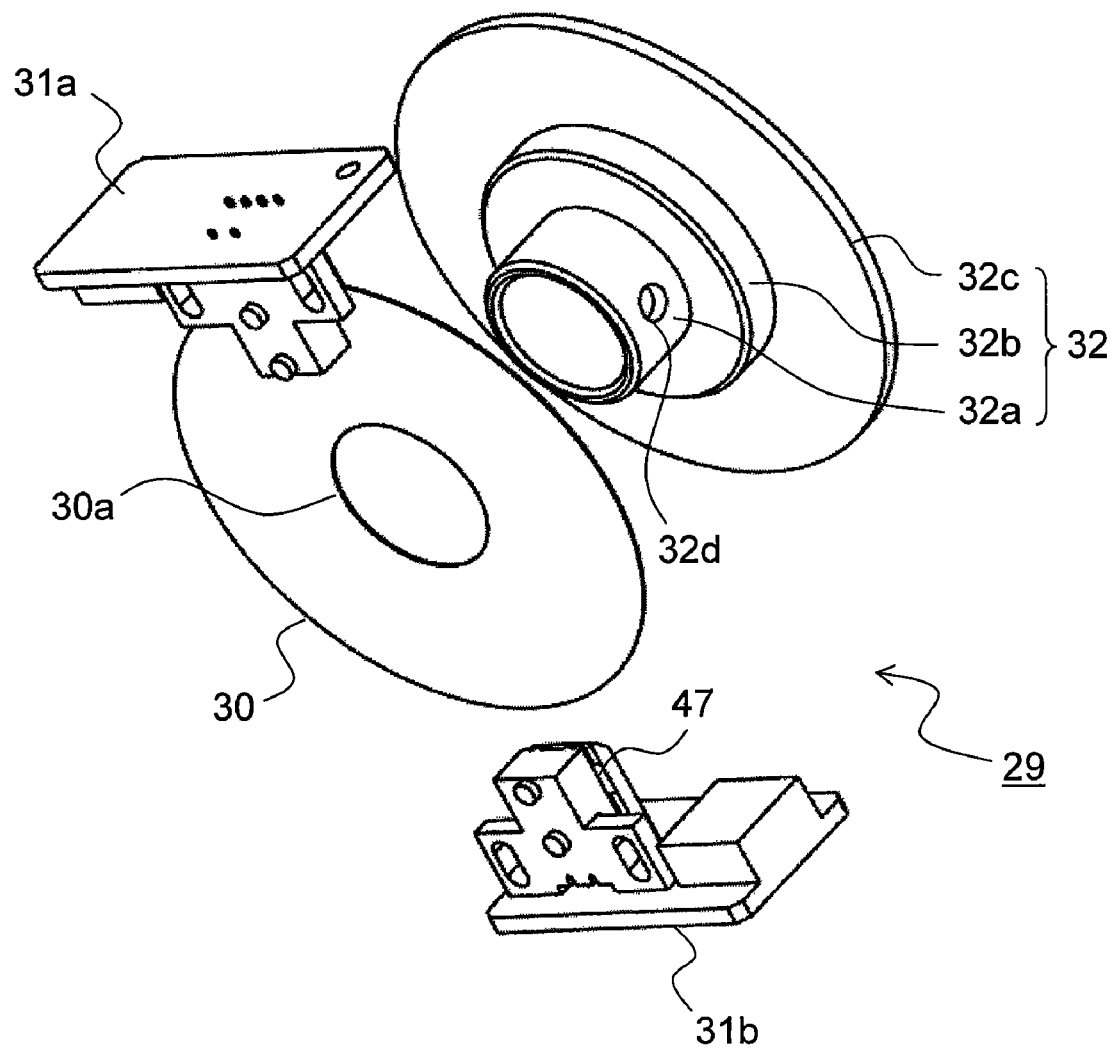
FIG. 5 is an enlarged perspective view of a velocity detection mechanism used in the drive unit of the present invention.

FIG. 5 is an enlarged and exploded perspective view of the velocity detection mechanism. The encoder 30 is obtained by cutting a transparent film made of polyethylene terephthalate (PET) into a ring shape. In an outer peripheral portion of the encoder 30, a number of black lines (not shown) are printed in a radial manner at a predetermined pitch, and a light transmissive portion and a light nontransmissive portion are formed. As the material for the encoder 30, resins, metals, and the like other than PET can also be used. In the case of using a metal plate, slits may be provided in a radial manner by etching or the like to form a light transmissive portion and a light nontransmissive portion.

The encoder attachment bracket 32 includes a small-diameter portion 32a, a middle-diameter portion 32b, and a flange portion 32c, and the small-diameter portion 32a is provided with a screw hole 32d into which a bracket fixing screw 45 (see FIG. 4) is threaded. Further, the outer diameter of the small-diameter portion 32a is substantially equal to the inner diameter of the center hole 30a of the encoder 30, and the outer diameter of the flange portion 32c is formed to be larger than the outer diameter of the encoder 30.

The sensor members 31a, 31b are placed at positions that are symmetric with respect to a rotation center of the encoder 30, i.e., positions bisecting the outer periphery of the encoder 30. Each of the sensor members 31a, 31b is provided with a slit portion 47, and a light-emitting portion and a light-receiving portion (not shown) are opposed to each other on an inner surface of the slit portion 47. When the encoder 30 is rotated while the outer peripheral portion of the encoder 30 is inserted in the slit portion 47, a black line passes between the light-emitting portion and the light-receiving portion, whereby light incident upon the light-receiving portion is interrupted at a predetermined time interval. An ON/OFF signal detected by the light-detecting portion at this time is output as a detection signal, whereby the revolution of the encoder 30, i.e., the output shaft 27 is detected.

Although two sensor members 31a, 31b are used in this case, the revolution of the output shaft can also be detected using only one of the sensor members. However, according to the configuration in which only one sensor member is used, in the case where the velocity fluctuation of the encoder 30 is detected, it cannot be determined whether the velocity fluctuation is caused by the rotation nonuniformity (angular velocity fluctuation) of the output shaft 27 or the eccentricity of the rotation center of the encoder 30.

In contrast, according to the configuration in which two sensor members 31a, 31b are placed so as to be symmetric with respect to the rotation center of the encoder 30, the phase of a fluctuation component caused by the eccentricity of the encoder 30 is shifted by 180°, and hence the eccentricity can be distinguished and detected. That is, a component obtained by subtracting a fluctuation component caused by the eccentricity of the encoder 30 from the detected revolution fluctuation is an angular velocity fluctuation component of the output shaft 27. Therefore, the rotation nonuniformity of the output shaft 27 can be corrected with a high precision by setting the angular velocity fluctuation to be targeted for feedback control.

Although three or more sensor members may be placed at positions equally dividing the outer periphery of the encoder 30, the increase in number of the sensor members increases cost accordingly. Two sensor members 31a, 31b are provided as in the above embodiment, whereby a detection precision that is practically sufficient and economically favorable is obtained.

Next, the assembly procedure of the drive unit 21 is described. First, the motor 23 is attached to the support plate 35, and the output shaft 27 with the velocity reduction gear 25 fixed thereto via the bearing 39b is attached to the through-hole 35a. On the other hand, after the small-diameter portion 32a of the encoder attachment bracket 32 illustrated in FIG. 5 is inserted in the center hole 30a of the encoder 30, the encoder 30 is attached to the middle-diameter portion 32b with a double-sided tape or the like to be fixed thereto. Then, as illustrated in FIGS. 3 and 4, the encoder attachment bracket 32 with the encoder 30 fixed thereto is externally inserted over the output shaft 27, and the bracket fixing screw 45 is threaded into the screw hole 32d, whereby the encoder attachment bracket 32 is fixed to the output shaft 27. Further, as illustrated in FIG. 2, the housing body 33 is fixed to the support plate 35 with the screws 37, and the bearing 39a externally inserted over the output shaft 27 is fixed to the through hole 33a to support the output shaft 27.

Herein, the encoder 30 remains exposed until the encoder 30 is accommodated in the housing body 33. Therefore, in the assembled state in which the encoder 30 is attached to the encoder attachment bracket 32 or during assembly of the drive unit 21, the outer peripheral portion of the encoder 30 may be damaged when the housing body 33 is attached. However, according to the configuration of the present invention, since the outer diameter of the flange portion 32c of the encoder attachment bracket 32 is larger than the outer diameter of the encoder 30, the contact between the outer periphery of the encoder 30 and other members is suppressed, and hence the outer periphery of the encoder 30 is protected.

Figure 6:
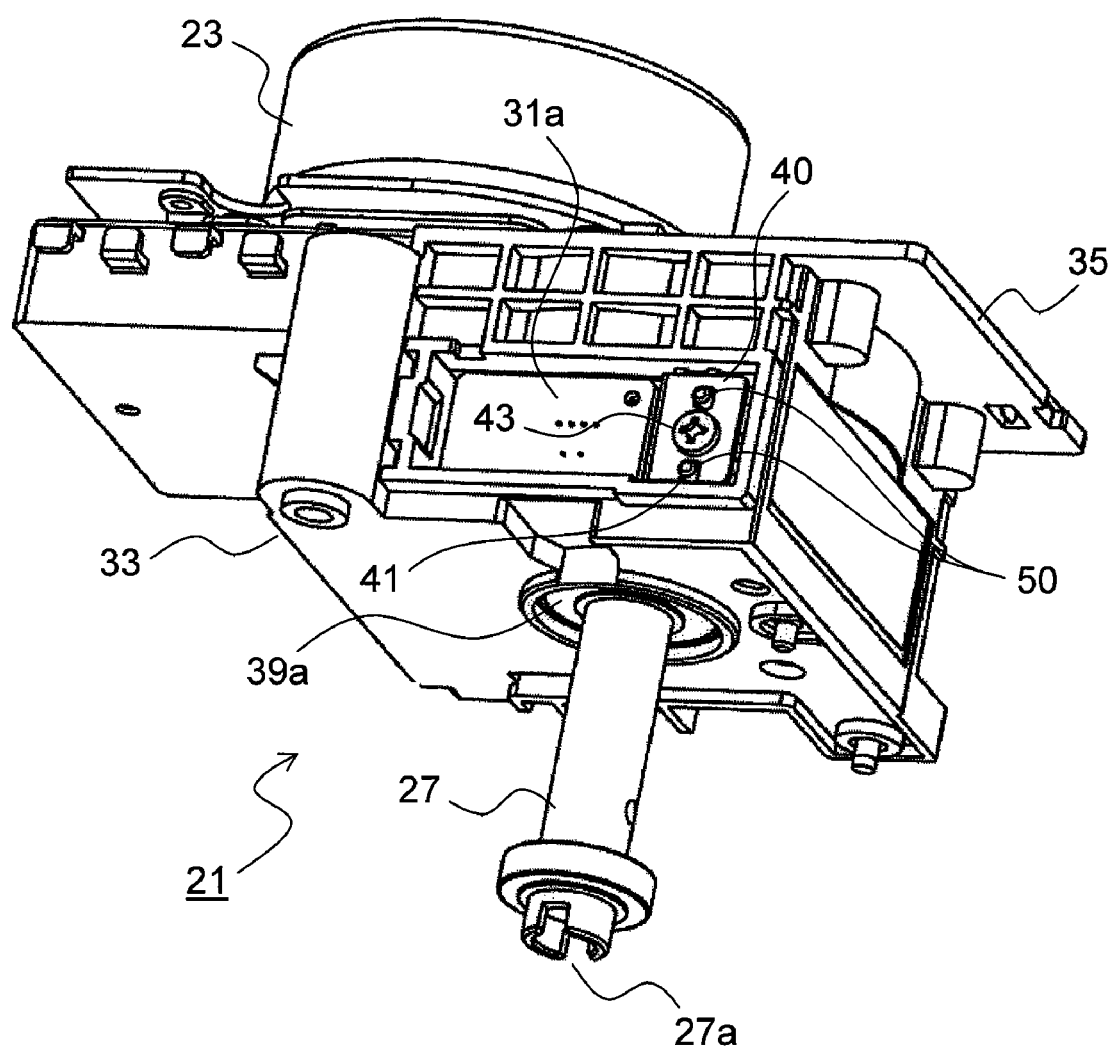
FIG. 6 is an external perspective view illustrating a state in which a sensor member is attached to the drive unit.

Then, as illustrated in FIG. 6, the sensor members 31a, 31b with the sensor attachment plates 40 fixed thereto are attached to open windows formed on the side surfaces of the housing body 33. At this time, the long holes 41 of the sensor attachment plates 40 are engaged with the support bosses 50 of the housing body 33, and the positions of the sensor members 31a, 31b in the direction of the output shaft 27 are adjusted in a range of the long holes 41 so that the encoder 30 is placed substantially at the center of the slit portions 47 (see FIG. 5) of the sensor members 31a, 31b.

Figure 7:
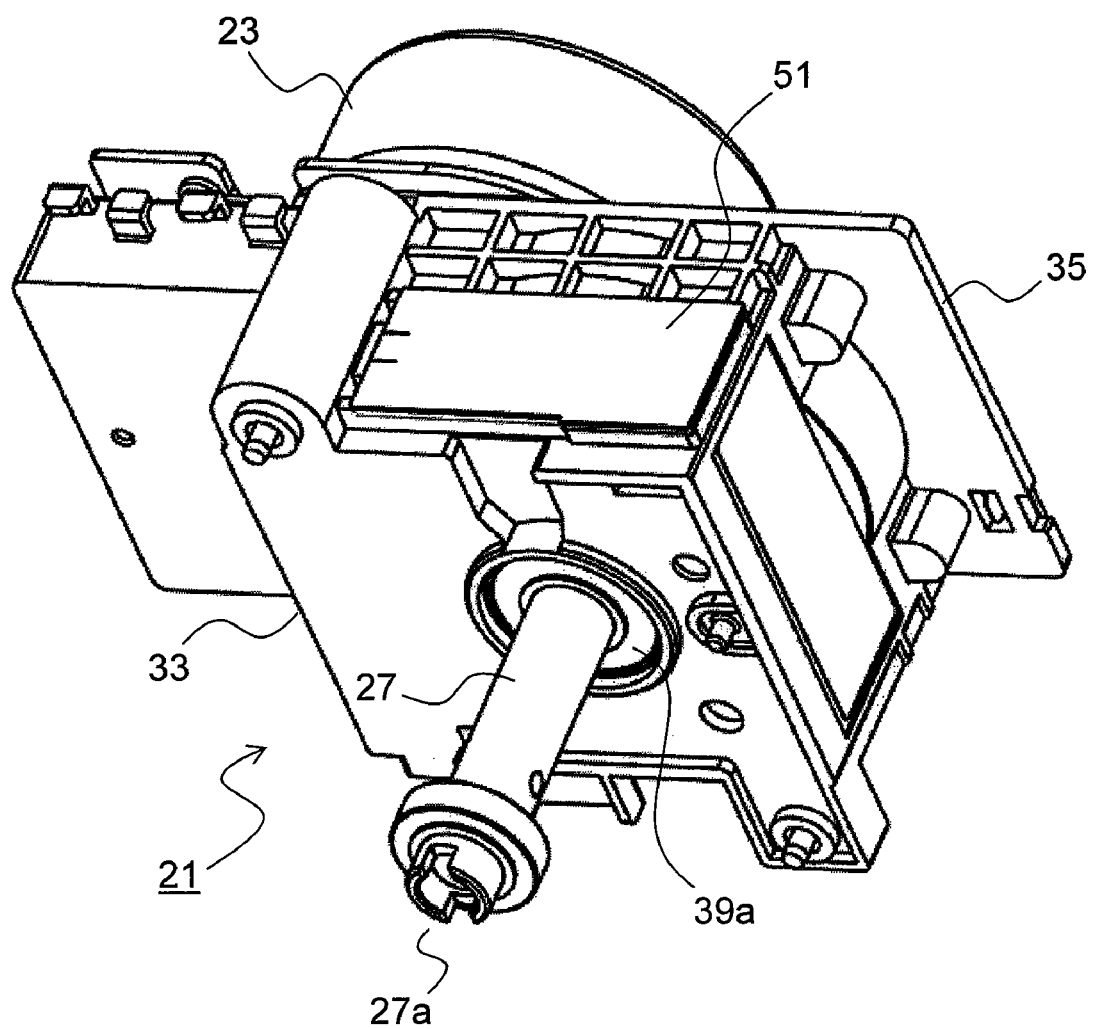
FIG. 7 is an external perspective view illustrating an assembled state of the drive unit.

After the positions of the sensor members 31a, 31b are adjusted, adjustment screws 43 are inserted in the guide holes 44 (see FIG. 3) and fastened to screw holes (not shown) of the housing body 33, whereby the sensor members 31a, 31b are fixed to the housing body 33. Note that, since the adjustment screws 43 are freely fitted in the guide holes 44 with a predetermined play in the shaft direction, even when the positions of the sensor members 31a, 31b are adjusted in the range of the long holes 41, the adjustment screws 43 can be fastened. Finally, a cover member 51 as illustrated in FIG. 7 is attached, whereby the assembly of the drive unit 21 is completed.

As described above, according to the configuration of the present invention, the velocity reduction gear 25, the encoder 30, and the sensor members 31a, 31b can be attached to the image forming apparatus body as the drive unit 21 accommodated in the unit housing 36. Therefore, the adhesion of dust and foreign matter to the encoder 30 and the sensor members 31a, 31b can be prevented. Furthermore, the image forming apparatus can be miniaturized and the space thereof can be reduced, and the assembly operability of the drive unit 21 and the attachability/detachability thereof with respect to the apparatus body are enhanced.

Further, since the output shaft 27 is supported by the outer wall surface (through-hole 33a) of the housing body 33 and the support plate 35 via the bearings 39a, 39b, the support interval of the output shat 27 can be set to be long. Thus, the tilt of the output shaft 27 caused by the shift of the support positions of the bearings 39a, 39b can be decreased. Further, the flange portion 32c of the encoder attachment bracket 32 functions as a partition wall partitioning the velocity reduction gear 25 from the encoder 30, and hence the adhesion of lubricating oil and abrasion powder scattered from the velocity reduction gear 25 to the encoder 30 and the sensor members 31a, 31b can be prevented.

Further, the sensor members 31a, 31b can be attached to and detached from outside of the housing body 33, and hence the operability during attachment and replacement of the sensor members 31a, 31b is enhanced. The positions of the sensor members 31a, 31b in the shaft direction of the output shaft 27 can be adjusted, and hence the clearance adjustment of the encoder 30 and the slit portions 47 becomes easy. Further, the cover member 51 covering the sensor members 31a, 31b is attached, and hence the sensor members 31a, 31b are sealed in the unit housing 36, and hence the occurrence of a reading defect caused by the adhesion of dust and foreign matters can be prevented effectively.

Further, the present invention is not limited to the above embodiment, and various modifications can be made without departing from the spirit of the present invention. For example, in the above embodiment, the drive unit 21 connected to the rotation shaft of the photosensitive drum 12 is exemplified. However, the present embodiment is not limited thereto, and the developing unit 14, the transfer unit 15, the cleaning unit 16, and the like can be used as a drive unit fixed to any rotation shaft in the image forming apparatus.

Further, needless to say, the drive unit of the present invention is applicable not only to a monochromic printer as illustrated in FIG. 1, but also to copiers such as a digital multi-function copier, a tandem-type color copier, and an analog-type monochromic copier, image forming apparatuses such as a facsimile and a laser printer, and precision equipment and electronic equipment requiring a rotation control with a high precision other than the image forming apparatuses.

The present invention is a drive unit including a motor to be a drive source for rotating members to be rotated, a velocity reduction gear that reduces the revolution of the motor, an output shaft that connects the velocity reduction gear to the members to be rotated, and a velocity detection mechanism including an encoder and a sensor member that detect the revolution of the output shat, in which the velocity reduction gear and the velocity detection mechanism are placed in a unit housing including a housing body with an opening formed at one end and a support plate closing the opening, and the output shaft is rotatably supported by the housing body and the support plate.

Accordingly, the adhesion of dust and foreign matters to the encoder and the sensor members can be prevented, and the image forming apparatus can be miniaturized and the space thereof can be reduced, whereby a drive unit with enhanced assembly operability and the attachability/detachability with respect to the apparatus body can be provided. Further, the output shaft is supported by the housing body and the support plate, and hence the support interval of the output shaft can be set to be long, resulting in an advantageous configuration with respect to the tilt of the output shaft. Thus, a needlessly-strict dimension precision is not required in the housing and the support plate, which is advantageous in terms of a production and a cost.

Further, the encoder is attached to the encoder attachment bracket on a side opposite to the velocity reduction gear, and the outer diameter of the encoder attachment bracket is set to be larger than the outer diameter of the encoder. Therefore, a drive unit can be obtained in which the adhesion of lubricating oil and abrasion powder scattered from the velocity reduction gear to the encoder and the sensor members is prevented, and the occurrence of a velocity detection defect can be suppressed. Further, the outer peripheral portion of the encoder can be protected from shock due to the encoder attachment bracket, and hence the damage to the encoder during unit assembly can also be suppressed.

Further, a fluctuation component caused by the eccentricity of the encoder can be detected among the velocity fluctuations due to the presence of a plurality of sensor members. Therefore, a drive unit can be provided, which is capable of controlling a velocity with a high precision by the feed-back of only the rotation nonuniformity of the output shaft. Further, the sensor members can be attached/detached with respect to outside of the housing, and the position in the shaft direction can be adjusted, and hence the operation during attachment and replacement of the sensor members becomes easy, which enhances the assembly operability and maintenance performance of the drive unit.

Having thus described in detail preferred embodiments of the invention, it is to be understood that invention defined by the foregoing paragraphs is not be limited to particular details and/or embodiments set forth in the above description, as many apparent variations thereof are possible without departing from the spirit or scope of the present invention.

What is claimed is:

1. A drive unit, comprising:
    a motor being a drive source for rotating a member to be rotated;
    a velocity reduction gear for reducing a revolution of the motor;
    an output shaft for connecting the velocity reduction gear to the member to be rotated;
    a velocity detection mechanism including an encoder, an encoder attachment bracket, and a sensor member for detecting a revolution of the output shaft by detecting a corresponding revolution of the encoder,
    wherein the velocity reduction gear and the velocity detection mechanism are placed in a unit housing including a housing body with an opening formed at one end and a support plate closing the opening;
    the output shaft is rotatably supported by the housing body and the support plate;
    wherein the encoder attachment bracket is mounted on the output shaft and comprises an encoder mounting portion for mounting the encoder thereon and a flange portion for providing a partition between the encoder and the velocity reduction gear; and
    the encoder is attached to the encoder mounting portion of the encoder attachment bracket with the flange portion positioned between the encoder and the velocity reduction gear to protect the encoder and the sensor member from foreign matter originating from the velocity reduction gear.

2. The drive unit according to claim 1, wherein the encoder has an outer diameter and an outer periphery and the flange portion of the encoder attachment bracket has an outer diameter larger than the outer diameter of the encoder to protect the outer periphery of the encoder from damage caused by inadvertent contact therewith by providing an outer stop to keep the outer periphery of the encoder from being contacted.

3. The drive unit according to claim 1, wherein a plurality of the sensor members are placed at positions for equally dividing an outer periphery of the encoder.

4. The drive unit according to claim 1, wherein the sensor member is attachable to and detachable from outside of the housing body.

5. The drive unit according to claim 1, wherein a position in a shaft direction of the sensor member is adjustable from outside of the drive unit.

6. The drive unit according to claim 1, wherein the sensor member is covered with a cover member that can be opened and closed.

7. An image forming apparatus, comprising:
    a paper feed portion configured to send a paper to an image forming portion;
    the image forming portion configured to form a toner image on the paper; and
    a drive unit configured to drive a photosensitive drum included in the image forming portion,
    wherein the drive unit includes a motor being a drive source for rotating a member to be rotated;
    a velocity reduction gear for reducing a revolution of the motor;
    an output shaft for connecting the velocity reduction gear to the member to be rotated; and
    a velocity detection mechanism including an encoder, an encoder attachment bracket, and a sensor member for detecting a revolution of the output shaft,
    wherein the velocity reduction gear and the velocity detection mechanism are placed in a unit housing including a housing body with an opening formed at one end and a support plate closing the opening;
    the output shaft is rotatably supported by the housing body and the support plate; and
    the encoder is attached to a side of the encoder attachment bracket fixed to the output shaft opposite to the velocity reduction gear.

* * * * *